United States Patent Office 2,892,212
Patented June 30, 1959

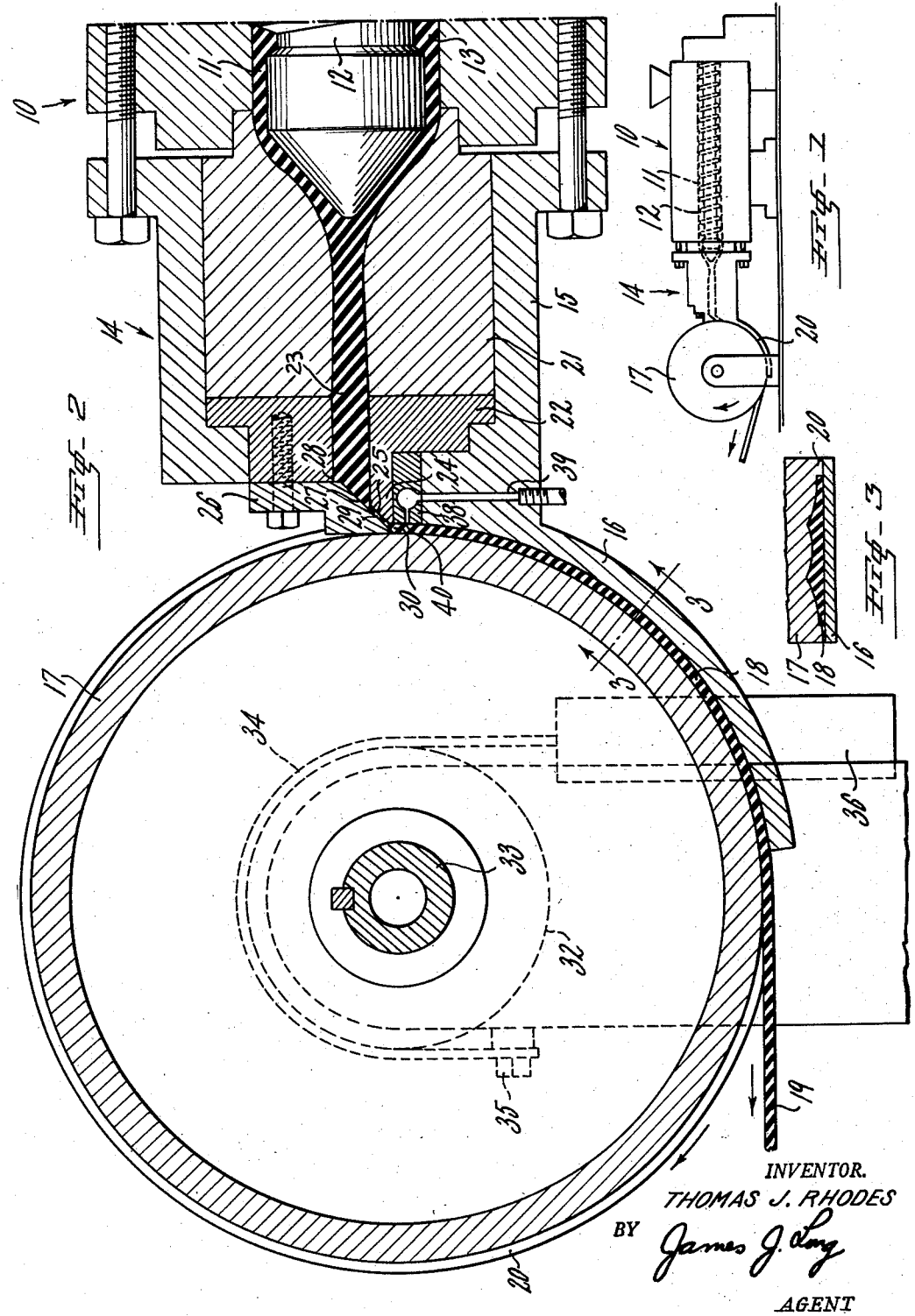

2,892,212

EXTRUSION APPARATUS

Thomas J. Rhodes, Clifton, N.J., assignor to United States Rubber Company, New York, N.Y., a corporation of New Jersey Application April 5, 1955, Serial No. 499,405

3 Claims. (Cl. 18—12)

This invention relates to an improved apparatus for accurately shaping plastic materials having the property known as "elastic memory," such as raw rubber compounds.

This invention involves extruding the plastic material under pressure through a restricted orifice into a confining and shaping space or chamber having a cross-sectional size greater than the size of the restricted orifice, and greater than the size to which the plastic would normally swell because of its elastic memory upon issuing freely from such an orifice. The confining and shaping chamber or space is greatly elongated, and is defined between a stationary lubricated surface, and a movable surface. The plastic stock advances continuously through the confining chamber under the influence of the extrusion pressure. The plastic is enabled to slide smoothly or slip with respect to the stationary surface because of the lubrication feature, while the movable surface, being in frictional engagement with the plastic, moves as a unit with the plastic, and the rate of advancement of the movable surface is so controlled as to retard the movement of the plastic in such manner that the plastic is made to fill out the confining space completely and compactly under the influence of the extrusion pressure. It is unexpectedly found that the plastic material after being subjected to such a shaping process surprisingly retains the shape and dimensions imparted to it with a degree of accuracy that is believed to be unprecedented in conventional extrusion operations.

This application is a continuation-in-part of my copending application Serial No. 449,164, filed August 3, 1954, which is in turn a division of application Serial No. 156,617, filed April 18, 1950 (now U.S. Patent 2,693,007). The disclosure of the said patent applications are incorporated herein by reference.

The need for the invention arises from the fact that when a raw rubber compound is shaped by extruding it under pressure through the usual extrusion orifice, the raw rubber changes its shape after passing from the extruder, by shrinking longitudinally and swelling radially of the extrusion axis, because of its property known as elastic memory. The amount of change of shape which takes place after conventional extrusion is observed in practice to be quite variable, so that it is extremely difficult to obtain a product with an exact desired size and shape, when employing the ordinary extrusion methods. The reason for this is that the tendency of typical elastic stocks, such as vulcanizable rubber stocks, to shrink or swell after extrusion, varies greatly with the composition and previous history of the stock, as well as with the precise conditions existing during and after the extrusion. Unavoidable time-to-time variations in the several factors which affect shrinkage make it virtually impossible, by ordinary extrusion methods, to produce consistently a precisely sized form in the factory.

The inability of conventional extrusion methods to yield an exact size is an occasion for appreciable economic waste in several respects, and leads to difficulties in quality control as well as undesirable non-uniformity in such articles as extruded tire treads. It will be appreciated that in making pneumatic tires according to the usual practice of extruding a continuous running length of tread stock, and cutting the extrudate to suitable size for application to the tire carcass on the tire building drum, the results can in general be no more uniform than the uniformity of the extruded tread in the first instance. Elaborate controls have sometimes been incorporated in conventional tire tread extruder lines, as represented for example by U.S. Patent 2,156,895 of Godat, in an effort to overcome the effects of non-uniformity in the extrudate and to provide in all cases the exact weight and volume of tread desired. However, such controls are quite complex and in practice they do not always provide as great a uniformity as would be desirable.

A principal object of the present invention is to ameliorate the foregoing difficulties.

The manner in which the invention realizes the foregoing and additional objects and advantages will be made manifest in the following detailed description, which is intended to be read with reference to the accompanying drawing, wherein:

Fig. 1 is a largely diagrammatic longitudinal elevational view of an extrusion device embodying the invention, for preparing extruded raw tire treads, Fig. 2 is an enlarged view of a portion of the apparatus of Fig. 1 with parts shown in section and parts broken away; and, Fig. 3 is a transverse sectional view of the apparatus, taken along the line 3—3 of Fig. 2, on a smaller scale.

In my invention I employ an undersize extrusion die, interposed between an extrusion chamber and a confining chamber in which the plastic acquires its final shape. The plastic, suitable at an elevated temperature, is forced from the extrusion chamber into and through the die by means of a piston or extrusion screw. The extrusion die has a comparatively restricted passageway which typically has at least the approximate general shape of the finally desired product, but is smaller in cross-sectional area than the final shaping and confining passageway. Such restricted extrusion orifice is made undersize in cross-sectional area, with respect to the area of the final confining passageway, to such an extent that the elastic material extruded through the restricted passageway would not of itself normally swell, upon emerging from such passageway, to a size sufficiently large to fill out entirely the final confining passageway. The confining passageway is defined between the surface of a rotatably mounted drum adjacent to the extrusion orifice, and a cooperating stationary lubricated confining shield extending from the extrusion orifice for a considerable distance around the rotary drum. I force the extruded plastic to completely fill out the confining passageway by retarding the rotation of the rotary drum, By limiting the speed of rotation of the rotary drum, I retard the flow of plastic through the final confining passageway sufficiently to develop a substantial "back pressure" within the plastic, so that it is forced to fill out the confining passageway entirely, in pressurized engagement with the walls of the passageway. I therefore, in effect, cause the plastic material to increase in cross-sectional size, or to swell, after it emerges from the extrusion orifice, to an appreciably greater extent than it normally would if extruded freely from the extrusion orifice. It has been found that the plastic stock, after thus being caused to swell to a greater than normal extent, and maintained in such swollen size between the moving confining surface of the rotary drum and the stationary lubricated confining surface, will, upon emerging from such confinement, substantially retain the size imparted to it during the confinement.

For the purpose of regulating or controlling the rotation of the drum and thereby similarly regulating the rate of advancement of the plastic in contact with the drum, there is provided in association with the drum a suitable braking arrangement to retard the rotation of the drum by a desired amount, or the drum may be driven by a controlled speed device which resists any tendency of the drum to exceed the desired extrusion speed.

The surface of the drum or of the confining shield, or both, may be contoured in accordance with the desired shape of the corresponding surfaces of the extrudate. More than one kind of stock may be extruded against the drum, as for example in the case of tire treads embodying the "cap and base" type of construction, in which the road-contacting portion of the tread is made of one kind of rubber stock and the under-tread is made of a different stock. Multiple extruders capable of delivering two or more kinds of stock through a common die orifice are suitable for this purpose and are well known. In preparing tire treads by means of the invention the tread may, after emerging from the confining passage, be deposited on a suitable conveyor and removed to a cutting station where it is cut into suitable lengths for subsequent application to a tire carcass. Alternatively, a tire carcass may be supported on the drum in engagement with the extruder, in which case the tread is extruded from the restricted orifice directly onto the surface of the tire carcass, and the tread and carcass move as a unit with the drum while the outer surface of the tread slides with respect to the outer lubricated confining shield. A single revolution of the drum serves to form the complete circumferential tread on the carcass, after which the drum is disengaged from the extruder and the assembly of tread and carcass is removed from the drum for further shaping and vulcanizing in accordance with conventional practice. For ease in removing the carcass from the drum, the drum may be collapsible (in the same manner as conventional collapsible tire building drums) or the drum may have a slightly smaller diameter than the carcass. In the case of the collapsible drum, such drum may serve also for building the carcass in the first instance by superimposing a plurality of plies of rubberized tire fabric on the surface of the drum in accordance with conventional practice.

The apparatus of the invention is likewise useful for continuously applying a layer of plastic to a running length of fabric or other flexible base material which is passed around the periphery of the drum during the extrusion so that the plastic stock is deposited on the flexible base as the stock emerges from the extrusion orifice. The plastic stock adheres to and moves with the base, which in turn rotates as a unit with the drum under the encircling stationary lubricated confining shield. The spacing between the outer surface of the fabric or other base and the inner surface of the confining shield, representing the desired thickness of the plastic layer, will be large in comparison to the size of the restricted die, as explained.

Referring to the drawing, the embodiment of the invention shown therein includes an extruder 10 having an extrusion chamber 11 in which there is rotated an extruder screw 12 for delivering raw rubber stock 13 under pressure into and through an extrusion head assembly 14, which is fastened to the delivery end of the extruder. The extruder head 14 includes an outer enclosing and mounting member 15, from the forward end of which a confining shield 16 extends downwardly and outwardly in curved fashion. A rotary drum 17 is mounted for free rotation and is in engagement with the extrusion head, and there is defined, between the principal peripheral surface of the drum 17 and the inner surface of the shield 16, a final shaping and confining cavity or passageway 18, having the precise cross-sectional size and shape of the desired extruded article 19, in this case a tire tread. As best seen in Fig. 3, a rim or flange 20 extends radially outwardly at each peripheral edge of the drum into sliding contact at its outer face with the inner lateral edge area of the shield to form side confining members defining sidewalls of the elongated shaping passageway 18.

Mounted within the shell 15, in concentric relationship therewith, is a preliminary shaping die member 21, in which the rubber stock is gradually changed in shape from the essentially cylindrical form which it had within the extrusion chamber 11, to a much wider and thinner sheet-like form. Mounted forwardly of the preliminary shaping member 21, there is a second die member 22, which serves to further shape the stock into sheet form, in an extrusion passageway 23 passing axially therethrough. The portion of the die member 22 defining the lower surface of the die passageway 23 has a forwardly extending portion 24 with a downwardly slanting face 25. An upper die plate 26 is secured to the front face of the intermediate die member 22, and has a lower downwardly and forwardly slanting face 27 arranged parallel to the slanting face 25 on the lower front portion of the intermediate die. The slanting face 27 of the upper plate begins at the discharge end 28 of the passage 23 in the intermediate die, and terminates at the peripheral surface of the drum 17. The faces 25 and 27 thereby define a die passageway 29, which is a continuation of the passageway 23 and which terminates in a discharge orifice 30 leading into the shaping and confining chamber 18 defined between the peripheral face of the rotary drum 17 and the face of the stationary shield 16. The die passageway 29 is relatively restricted in thickness compared to the preliminary shaping passageway 23, and it is also relatively restricted compared to the thickness of the final shaping passageway 18 between the shield and drum. The restricted passageway 29 is made undersize with respect to the final passageway 18 to such an extent that the plastic stock if extruded freely from the passageway 29 would not swell to a size as great as the size of the passageway 18. However, the resistance to flow of plastic stock through or along the passageway 18 is such that there is created a definite "back pressure" which causes the stock to completely fill out the passageway 18 after passing from the restricted passageway 29.

To control the rate of rotation of the drum 17, a brake drum 32 is mounted on one end of an axial shaft 33 of the drum, and a brake band 34 is disposed over the brake drum. One end of the brake band is attached, as by a bolt 35, to the fixed framework of the machine, while the other end of the band carries a depending weight 36. The magnitude of the weight 36 may be varied to adjust the braking force to a desired value.

To permit movement of the extruded tread 19 as a unit with the rotating drum 17, without disruption or internal shearing of the stock, the inner surface of the shield is lubricated by a lubricating gland 38 disposed in the surface of the lower portion of the outer die assembly, immediately adjacent to the die orifice 30. Such gland is supplied with lubricant through a lubricant line 39 extending through the extruder head, and connected to an exterior pump (not shown) which serves to deliver continuously a liquid lubricating substance that is not deleterious to the rubber stock, such as liquid silicone mold release composition, paraffin oil, glycerols, polyglycols, or aqueous solutions of hide glue, or of synthetic wetting agents such as sodium sulfate. A gear pump capable of delivering relatively small volumes at moderately high pressures (e.g. 1500–2000 p.s.i.) is particularly suitable for this purpose. The arrangement is such that a continuous thin film of lubricant is introduced across the entire surface of one side of the extrudate immediately after it emerges from the restricted orifice 30, and such thin film prevents the extrudate from frictionally engaging the inner surface of the confining shield 16. The exit orifice 40 from the lubricating gland is in the form of a very fine slit parallel to and closely spaced from the die orifice 30.

The length of the shield 16 is such that the tread 19 becomes essentially fixed in size and shape while passing through the cavity 18 defined between the drum and the shield, and the product after emerging from the device displays substantially no tendency to shrink. With the usual vulcanizable rubber stocks, the length of the confining shield is suitably such that at the usual rates of extrusion the extrudate is confined in the desired shape and size for at least 2 seconds, and preferably for 3 to 10 seconds. Longer times of confinement such as 15 or 20 seconds may be used, but are without proportionate added advantage with respect to the degree of stabilization. Since the stock is normally at a rather elevated temperature during the extrusion, to render it plastic and readily flowable, and since the stock is heat-sensitive, that is, the stock is vulcanizable by exposure to heat, it is desirable not to prolong the time that the stock is in the extrusion device any longer than necessary, in order to avoid difficulties from pre-vulcanization or "scorching" within the apparatus.

After emerging from the apparatus, the stabilized tread 19 is subsequently cut into suitable lengths for application to the tire carcass.

The stabilizing effect and elimination of shrinkage obtained in the invention by employing the restricted orifice before the final shaping passageway is believed to be due to the fact that after passing from such restricted orifice, the stock is made to swell to a size greater than that to which it would ordinarily swell if freely extruded from the same orifice. Such enforced excess swelling eliminates the tendency of the product to shrink axially of the extrusion direction. With the usual plastic stocks having elastic memory, such as raw rubber stocks, the cross-sectional area of the restricted passageway is suitably less than 50%, and preferably only 10% to 30%, of the cross-sectional area of the final shaping passageway. If the usual rubber stocks were freely extruded, without applied back-pressure, from such a restricted orifice they would not swell of their own accord to a size equal to the size of the final shaping passageway used in the present invention. By application of retarding force to the drum, back-pressure is exerted on the extruded product, in the present process, so that the stock is made to swell the additional amount necessary to fill out the final shaping passageway in firm pressurized engagement with the walls thereof.

While it is not desired to limit the invention to any particular theory of operation, it is believed that the excess swelling enforced upon the stock in the present process causes the plastic molecules to be largely re-oriented in radial directions transverse to the axis of the extrusion. Shrinkage of the extrudate is commonly considered to be a consequence of the extreme axial orientation of the molecule during the conventional extrusion operation. In the present process, it is possible that the enforced trans-axial re-orientation of the molecules substantially eliminates the tendency to shrink by largely destroying the normal strong axial orientation of the molecules.

Another important aspect of the stabilizing process and apparatus of the invention lies in the lubricating feature, which makes it possible to effect the stabilization by preventing disruption of the rubber stock by frictional forces, which would in themselves ordinarily introduce distorting stresses into the rubber stock.

Having thus described my invention, what I claim and desire to protect by Letters Patent is:

1. An apparatus for continuously forming dimensionally stable rubbery articles of indeterminate length and of fixed, constant cross-section and having no tendency to shrink longitudinally, comprising a rotary drum mounted for free rotation, a stationary, confining shield disposed concentrically around a portion of the circumference of the drum, said drum and shield defining a confining passageway having a constant and uniform transverse cross-section substantially identical with that of the rubber article to be produced, a stuffer for advancing plastic, vulcanizable rubber into the confining passageway at a pressure at which the rubber will be forced to fill the passageway, a shaping die interposed between the stuffer and the confining passageway for delivering rubber from the stuffer into the passageway and having an orifice of the general configuration of said passageway but of a cross-sectional area of from 10% to 50% of the transverse cross-section of the desired rubber article, means disposed adjacent to the junction of said shield and said die for applying a lubricant to that surface of the rubber which is to be in contact with said shield, and braking means operating, in opposition to the pressure of the advancing rubber, to retard the rotation of said drum caused by said pressure.

2. An apparatus for forming tire tread of definite, predetermined stabilized dimensions from raw vulcanizable rubber stock, comprising a rotary drum mounted for free rotation, a stationary confining shield concentrically disposed around a portion of the circumference of the drum, said drum and shield defining an elongated confining passageway between them having the cross-sectional area of the desired tread, a stuffer for advancing raw vulcanizable rubber in plastic condition into the confining passageway under pressure, a shaping die having a cross-sectional area equal to from 10% to 50% of the cross-sectional area of the desired tread and being interposed between the stuffer and the confining passageway, means disposed adjacent the junction of said passageway and said die for applying a lubricant to that surface of the extruded rubber which is subsequently to contact the shield for preventing frictional drag between the rubber and the shield, and braking means operatively connected to said drum for retarding the rotation of the drum and applying a back pressure on the rubber leaving the die, whereby the rubber is made to swell in the confining passageway to a size greater than that to which it ordinarily would swell if freely extruded from the die, so that the rubber upon emerging from said passageway retains the shape and dimensions thus imparted to it.

3. An apparatus for continuously forming dimensionally stable rubbery articles of indeterminate length and of fixed, constant cross-section and having no tendency to shrink longitudinally, comprising a rotary drum mounted for free rotation, a stationary, confining shield disposed concentrically around a portion of the circumference of the drum, said drum and shield defining a confining passageway having a constant and uniform transverse cross-section substantially identical with that of the rubber article to be produced, a stuffer for advancing plastic, vulcanizable rubber into the confining passageway at a pressure at which the rubber will be forced to fill the passageway, a shaping die interposed between the stuffer and the confining passageway for delivering rubber from the stuffer into the confining passageway and having an orifice of the general configuration of said passageway but of a cross-sectional area smaller than the transverse cross-section of the desired rubber article, means disposed adjacent to the junction of said shield and said die for applying a lubricant to that surface of the rubber which is to be in contact with said shield, and braking means operating, in opposition to the pressure of the advancing rubber, to retard the rotation of said drum caused by said pressure.

References Cited in the file of this patent

UNITED STATES PATENTS

| | | |
|---|---|---|
| 1,844,972 | Parkhurst | Feb. 16, 1932 |
| 2,378,539 | Dawihl | June 19, 1945 |
| 2,597,553 | Weber | May 20, 1952 |
| 2,692,406 | Rhodes | Oct. 26, 1954 |
| 2,693,007 | Rhodes | Nov. 2, 1954 |
| 2,798,253 | Rhodes | July 9, 1957 |